(12) United States Patent
Ekiner

(10) Patent No.: US 6,383,265 B1
(45) Date of Patent: May 7, 2002

(54) POLYMER BLEND MEMBRANES WITH IMPROVED MECHANICAL PROPERTIES

(75) Inventor: Okan Max Ekiner, Wilmington, DE (US)

(73) Assignee: L'Air Liquide Societe Anonyme A Directoire et Conseil de Surveillance pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 09/929,028

(22) Filed: Aug. 15, 2001

Related U.S. Application Data

(62) Division of application No. 09/306,824, filed on May 7, 1999, which is a division of application No. 08/994,041, filed on Dec. 19, 1997, now Pat. No. 5,922,791.

(51) Int. Cl.[7] .............................. D01D 5/12; B01D 53/22
(52) U.S. Cl. ........................ 96/10; 96/8; 96/13; 96/14; 264/45.9; 264/171.26; 264/209.1; 264/209.3; 264/209.5
(58) Field of Search ............................ 96/8, 10, 13, 14; 264/45.9, 171.26, 209.1, 209.3, 209.5

(56) References Cited

U.S. PATENT DOCUMENTS

| | | |
|---|---|---|
| 4,385,148 A | 5/1983 | Sundet |
| 4,529,763 A | 7/1985 | Tamura et al. |
| 4,595,708 A | 6/1986 | Sundet |
| 4,983,191 A | 1/1991 | Ekiner et al. |
| 5,047,487 A | 9/1991 | Camargo et al. |
| 5,085,676 A | 2/1992 | Elkiner et al. |
| 5,232,472 A | 8/1993 | Simmons et al. |
| 5,248,319 A | 9/1993 | Ekiner et al. |
| 5,443,728 A | 8/1995 | Macheras et al. |
| 5,468,430 A | 11/1995 | Ekiner et al. |
| 5,505,851 A | 4/1996 | Wagener et al. |
| 5,820,659 A | 10/1998 | Ekiner et al. |

FOREIGN PATENT DOCUMENTS

EP  0 648 812  4/1995

OTHER PUBLICATIONS

R.L. Scott, *J. Chem. Physics*, vol. 17, pp. 279–284 (1949).
D.R. Paul & S. Newman, *Polymer Blends*, vol. 1, Chapter 2, Academic Press, San Francisco, London (1978).
O. Olabasi et al., *Polymer—Polymer Miscibility*, "Polymer–Polymer Compatibility," Academic Press, NY (1979).
Pierre–Gillesde Gennes, *Scaling Concepts in Polymer Physics*, Chapter 4, Section 4.1 and 4.2, Cornell University Press (1979).

*Primary Examiner*—Ana Woodward
(74) *Attorney, Agent, or Firm*—Burns, Doane, Swecker & Mathis, L.L.P.

(57) ABSTRACT

Improved polymer blends, and polymer blend membranes having improved mechanical properties are provided by alteration of the critical solution temperature of the polymer blend spinning solution through the incorporation of organic or inorganic complexing agents.

17 Claims, 2 Drawing Sheets

POLYMER BLEND MEMBRANES WITH IMPROVED MECHANICAL PROPERTIES

This application is a divisional of application Ser. No. 09/306,824, filed on May 7, 1999, which is a divisional of application Ser. No. 08/994,041, filed on Dec. 19, 1997 (now U.S. Pat. No. 5,922,791).

BACKGROUND OF THE INVENTION

1. Field of the Invention

This invention relates to polymer blend, hollow fiber membranes having improved mechanical properties by alteration of the thermodynamic phase equilibrium of the concentrated polymer blend spinning solution through the incorporation of organic or inorganic complexing agents.

2. Description of the Related Art

The science of polymer blend miscibility and the prediction of the types of phase diagrams for polymer blends in solutions are quite complex. Unusual two-peaked coexistence curves and phase diagrams with a tendency toward greater miscibility at intermediate temperatures are reported in the literature for different polymer blends. The following articles and textbooks depict the complexity of the theory of polymer blend miscibility and provide several examples of different thermodynamic phase diagrams for polymer blends:

R. L. Scott, *J. Chem. Physics*, Vol. 17, p. 279 (1949);

D. R. Paul & S. Newman, *Polymer Blends*, Vols. 1 and 2, Academic Press, San Francisco, London (1978);

0. Olabasi et al., *Polymer—Polymer Miscibility*, Academic Press, NY (1979); and Pierre-Gillesde Gennes, *Scaling Concents in Polymer Physics*, Chapter 4, Sections 4.1 and 4.2, Cornell University Press (1979).

Polymer blends which are molecularly compatible in the solid state at temperatures below the glass transition temperature of the blend might exhibit a thermodynamic phase equilibrium consisting of a coexistence curve in the solution state. The coexistence curve is the locus of the critical solution temperature (CST) as a function of the blend composition.

A particular blend solution might exhibit a coexistence curve for the higher critical solution temperature (HCST), or for the lower critical solution temperature (LCST), or for both the HCST and the LCST. For any-specific blend composition, the blend solution is two-phase if the temperature is below the HCST or if the temperature is above the LCST (assuming that the phase diagram contains coexistence curves both for the HCST and LCST). For that type of phase diagram, the blend solution is single phase for any specific blend composition if the blend solution temperature is above the HCST and below the LCST.

U.S. Pat. No. 5,047,487 issued to Camargo et al. discloses that ULTEM 1000, a polyetherimide available from GE, and MATRIMID 5218, a phenylindane-containing polyimide available from Ciba, are molecularly compatible in the solid state. The molecular scale compatibility of the two polymers over the entire blend composition range was characterized by Camargo et al. utilizing the technique of Differential Scanning Calorimetry (DSC). The ULTEM/MATRIMID blends exhibit a single glass transition temperature ($T_g$) located in between the $T_g$ of the individual blend components over the entire blend composition range, which indicates molecular-scale blend miscibility.

U.S. Pat. No. 5,085,676 issued to Ekiner et al. discloses solution spinning of hollow fiber membranes from concentrated ULTEM/MATRIMID blend solutions. U.S. Pat. No. 5,443,728 discloses membranes prepared from blends of polyetherimide and phenylindane-containing polyimides.

In prior practices, blend solutions have been stored above the HCST to ensure phase homogeneity. This may unfortunately result in polymer degradation reactions due to sensitivity of the blend polymers to high temperature exposure for prolonged times. The degradation of the blend polymer adversely affects the final product properties.

On the other hand, storage at temperatures below the HCST results in a two-phase solution. With prior methods, additional processing steps for heating and mixing of the two-phase blend solution were needed for formation of a homogenous blend solution prior to the final processing step. A two-phase blend polymer phase morphology in the solution state would also adversely affect the fiber spinning process continuity and the final product properties.

ULTEM and MATRIMID polyimide solutions are particularly susceptible to molecular weight degradation reactions in the solution state when exposed to elevated temperatures for prolonged times.

It is, therefore, an object of the present invention to provide a polymer blend that does not suffer from the disadvantages mentioned above. In particular, it is an object of the present invention to depress the HCST of a polymer blend solution in order to enhance its phase stability during low temperature storage prior to processing. It is a further object of the present invention to depress the HCST of the ULTEM/MATRIMID blend solution formulations in order to permit storage of the solutions at lower temperatures without phase separation prior to solution spinning into hollow fiber form.

These and other objects of the invention will become apparent in light of the following specification, the figures, and the claims appended hereto.

SUMMARY OF THE INVENTION

In one of its composition aspects, the present invention relates to a polymer blend comprising a plurality of polymers and a CST adjustment agent. As used herein, a CST adjustment agent is an organic or inorganic complexing agent which enhances the miscibility of two or more polymers in solution.

Polymer blends particularly suited for use in the present invention include polyimide blends such as a blend of polyetherimide and phenylindane-containing polyimide. In a preferred embodiment, the polymer blend comprises two commercially available polymers, ULTEM and MITRIMID. Preferably, the polymer blend comprises between about 80% and 95% by weight of polyetherimide and the balance phenylindane-containing polyimide.

The CST adjustment agent is preferably an alkali or alkaline earth metal halide such as $ZnCl_2$, $CaBr_2$, and LiCl.

The CST adjustment agent can also be organic; in which case, triethylamine is particularly preferred.

It has been surprisingly found that through the use of a CST adjustment agent according to the present invention, the HCST of a polymer blend solution is lowered by at least 10° C. relative to the same blend solution without the addition of a CST adjustment agent.

In another of its composition aspects, the present invention relates to a polymer blend which has been annealed at elevated temperature. It has been surprisingly discovered that annealing a polymer blend solution at elevated temperature has the effect of lowering the HCST of the solution. The precise annealing time depends on the polymer blend solution employed. Such times can be determined by routine optimization by those skilled in the art for the particular polymer blend solution. The polymer blend solution is preferably annealed at an elevated temperature between 50° and 140° C., and more preferably between 700° and 100° C. In this embodiment, the polymer blend may or may not contain a CST adjustment agent.

In one of its method aspects, the present invention relates to a method for modifying the CST of a polymer blend solution by combining the polymer compounds of the polymer blend together with a solvent and a CST adjustment agent. The resulting CST-modified polymer blend solution may be used to form hollow fiber membranes having improved mechanical properties.

In another of its method aspects, the present invention relates to a method for lowering the CST of a polymer blend solution by annealing the solution at elevated temperature.

In yet another of its method aspects, the present invention relates to a method for the separation of gases from a mixture, preferably air. The method includes the step of bringing the gas mixture into contact with a composite hollow fiber membrane formed from a polymer solution containing a CST adjustment agent in accordance with the present invention, at an elevated pressure to preferentially permeate at least one component of the gas mixture to produce at least one gaseous product.

DETAILED DESCRIPTION OF THE INVENTION

The present invention will now be described with particular reference to ULTEM/MATRIMID blends. However, it should be recognized that the present invention is applicable to other polymer blends including blends of polyimides.

Effect of Organic and Inorganic Additives on the HCST of the Blend Solutions

In a particularly preferred embodiment, the present invention employs an organic or inorganic complexing agent to change the phase behavior, namely, the LCST or HCST, of a concentrated ULTEM/MATRIMID blend solutions in N-methylpyrrolidone (NMP) solvent. The complexing agent complexes with the polymer chains and the solvent NMP.

It was surprisingly found that polymer chain conformational structure and chain mobility in the solution state may be altered through the formation of complexes. As illustrated in the examples below, some complexing agents increase the HCST resulting in impaired miscibility at low temperatures, while others decrease the HCST resulting in enhanced miscibility at low temperatures. The LCST may likewise be altered if the blend solution exhibits a coexistence curve for the LCST. With the present invention, complexing agents have been determined which are effective in altering the thermodynamic phase equilibrium of polymer blend solutions, useful in fiber spinning.

Figure 1:
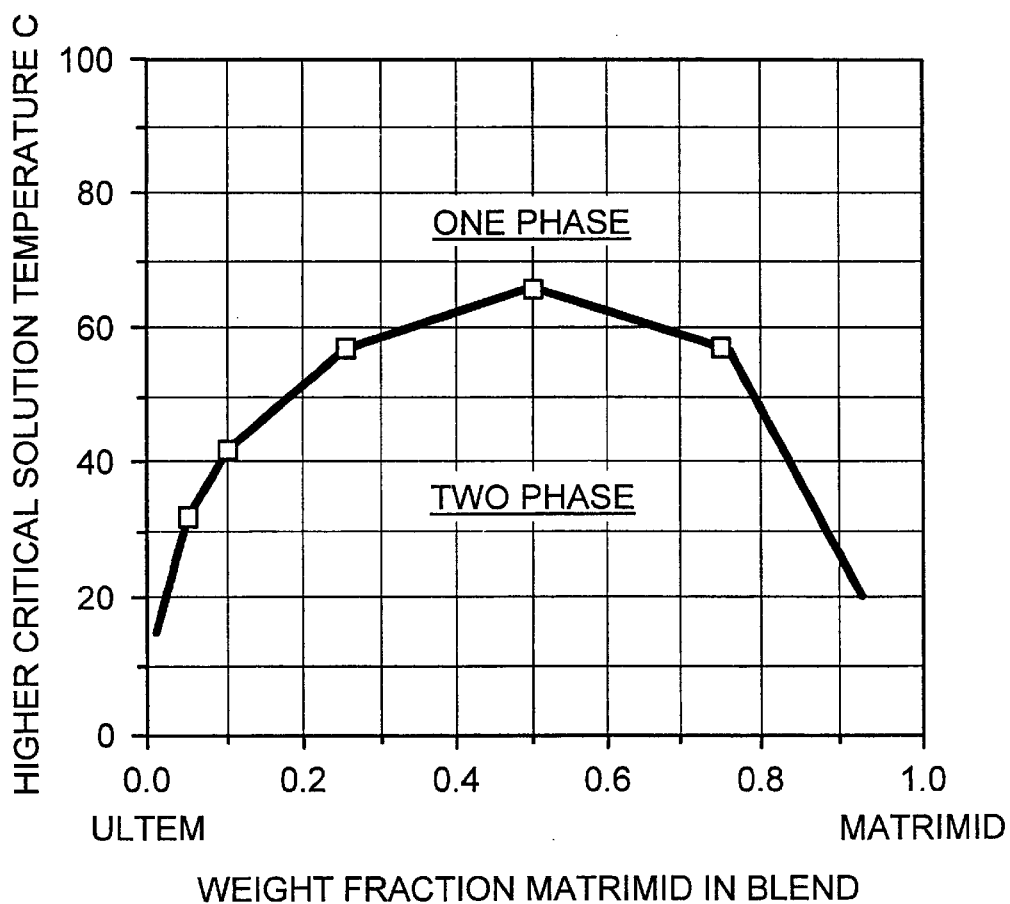
FIG. 1 is a phase diagram of a 31% by weight total polymer content ULTEM/MATRIMID blend solutions in NMP solvent.

Referring now to the figures, FIG. 1 is a phase diagram of a 31% by weight total polymer content ULTEM/MATRIMID blend solutions in NMP solvent. The phase equilibrium data shown in FIG. 1 were obtained by visual observation for each single phase blend composition solution heated to a temperature above the HCST by measurement of the solution temperature at which the solution starts to become cloudy as the solution temperature approaches the HCST and finally becomes two-phase as the solution temperature decreases below the HCST.

The same data could presumably be obtained by heating a two-phase solution and measuring the temperature at which the blend solution becomes a single phase and clear. The transformation from the single-phase region to the two-phase region was found to be very sharp, while the transformation from the two-phase region to the single-phase region was broad and covered a wide temperature range.

As seen in FIG. 1, the ULTEM/MATRIMID blend solutions exhibit a coexistence curve for the HCST. The blend solutions may also exhibit a coexistence curve for the LCST at temperatures higher than the data shown in FIG. 1.

The effect of different organic and inorganic additives on the thermodynamic phase behavior of the concentrated 95:5 and 90:10 ULTEM:MATRIMID blend solutions in NMP solvent are summarized in Tables 1 and 2 below. The data shown in these tables clearly indicate that some of the additives enhance thermodynamic miscibility and some impair miscibility, as evidenced by the decrease or increase in the HCST of these solutions with respect to the control. $ZnCl_2$, $CaBr_2$, LiCl, and triethylamine are preferred completing agents because they enhance the miscibility of the ULTEM:MATRIMID blend solutions, while $LiNO_3$, NaBr, and tetramethylenesulfone are not preferred because they appear to impair the miscibility of the same solutions.

TABLE 1

EXAMPLES OF ADDITIVES WHICH AFFECT THE HCST OF THE ULTEM:MATRIMID BLEND SOLUTIONS

| Solution | HCST (° C.) |
| --- | --- |
| Control* | 33 |
| Control* + 0.3% $ZnCl_2$ | <25 |
| Control* + 0.3% triethylamine | 27 |
| Control* + 0.3% triethylamine + 2.3% $LiNO_3$ | 57 |
| Control* + 0.3% triethylamine + 9.3% tetramethylenesulfone | 43 |
| Control* + 0.3% $CaBr_2$ | <25 |
| Control* + 0.3% NaI | 25 |
| Control* + 2.3% NaI | 35 |
| Control* + 2.3% $CaBr_2$ | 30 |
| Control* + 2.3% ammonium iodide | 32 |
| Control* + 2.3% ammonium bromide | 33 |
| Control* + 0.3% $ZnCl_2$ + 9.3% tetramethylenesulfone | 38 |
| Control* + 2.3% NaBr | 49 |
| Control* + 2.3% $ZnBr_2$ | 29 |
| Control* + 2.2% $ZnBr_2$ + 6.2% tetramethylenesulfone | 31 |

(*Control = 31% (95:5 ULTEM:MATRIMID) Blend Solution in NMP)

TABLE 2

EXAMPLES OF ADDITIVES WHICH AFFECT THE HCST
OF THE ULTEM:MATRIMID BLEND SOLUTIONS

| Solution | HCST (° C.) |
|---|---|
| Control* | 40 |
| Control* + 0.3% LiCl | 28 |
| Control* + 0.3% $ZnCl_2$ | 25 |
| Control* + 0.3% triethylamine | 35 |
| Control* + 0.3% $LiNO_3$ | 50 |
| Control* + 0.3% $MgCl_2$ | 37 |
| Control* + 0.3% $ZnCl_2$ + 2.3% NaI + 6.2% tetramethylenesulfone | 25 |
| 34% (90:10 ULTEM:MATRIMID) BLEND + 2.6% $CaBr_2$ in NMP | 31 |
| 32.5% (90:10 ULTEM:MATRIMID) BLEND in NMP | 43 |
| 32.5% (90:10 ULTEM:MATRIMID) BLEND + 2.5% $CaBr_2$ + 6.5% tetramethylenesulfone in NMP | 41 |

*(Control = 31% (90:10 ULTEM:MATRIMID) Blend Solution in NMP)

Effect of Annealing on the HCST of the Blend Solutions

In another particularly preferred embodiment, the present invention employs annealing to change the phase behavior, namely, the LCST or HCST, of a concentrated ULTEM/MATRIMID blend solutions in N-methylpyrrolidone (NMP) solvent. The blend solutions may or may not contain a complexing agent.

It is demonstrated below that controlled annealing of the freshly prepared ULTEM/MATRIMID blend solutions containing the preferred complexing agents such as $CaBr_2$ at a temperature above the HCST of the blend solution results in a further depression in the HCST of the solution. The data shown in Table 3 depicts the depression in the HCST of a concentrated 90:10 ULTEM:MATRIMID blend solutions containing $CaBr_2$ as the complexing agent.

TABLE 3

EFFECT OF ANNEALING ON THE HCST
OF BLEND SOLUTIONS

| Sample | Time Annealed at 70° C. (hrs) | Time Annealed at 90° C. (hrs) | HCST (° C.) |
|---|---|---|---|
| Control * | 0 | 0 | 41 |
| Control * Annealed | 3 | 0 | 39 |
| Control * Annealed | 6 | 0 | 39 |
| Control * Annealed | 9 | 0 | 37 |
| Control * Annealed | 24 | 0 | 33 |
| Control * Annealed | 0 | 3 | 34 |
| Control * Annealed | 0 | 6 | 32 |
| Control * Annealed | 0 | 17 | 27 |

*Control = 32.5% (90:10 ULTEM:MATRIMID) Blend + 2.4% $CaBr_2$ + 6.5% Tetramethylenesulfone in NMP. Control exposed to 80° C. for 2 hours and 90° C. for 2 hours during preparation.

The data in Table 3 indicate that annealing of the blend solution containing the complexing agent $CaBr_2$ enhances the thermodynamic phase miscibility of the blend solution.

It was also determined that annealing of the ULTEM:MATRIMID blend solution in NMP which does not contain any additives also enhances the thermodynamic miscibility of the solution, but to a lesser extent than the counterpart solution containing the preferred complexing agents. As an example, a 31% (90:10 ULTEM:MATRIMID) blend solution in NMP prepared at room temperature exhibited an HCST of about 40° C. After annealing the same solution at 70° C. for about 15 hours, the HCST was reduced to 35° C.

As another example on the effect of annealing the blend solution, a solution containing 31% (90:10 ULTEM:MATRIMID) blend +0.31% $MgCl_2$ in NMP which was prepared at room temperature exhibited an HCST of about 38° C. After annealing the blend solution at 70° C. for about 15 hours, the HCST was reduced to 27° C.

While not wishing to be bound by any particular theory, it is believed that the presence of the preferred complexing agents in the solution facilitates the break up of some type of polymer chain associations and enhances the thermodynamic miscibility. Annealing the solutions also appears to alter the polymer chain conformational structure in the solution state. Annealing of the blend solution in the presence of the preferred complexing agents appears to accelerate the transformation of breaking up of the polymer chain associations in the liquid state. This transformation occurs in the absence of any appreciable polymer molecular weight breakdown.

In the absence of polymer molecular weight breakdown, this thermodynamic transformation appears to be reversible. Long time storage of the annealed solutions at a temperature below the HCST of the blend solution results in a gradual increase in the HCST eventually approaching the HCST of the unannealed solution. The time scale for the thermodynamically reversible transformation is on the order of several weeks.

Reannealing of the blend solution which exhibits an increase in HCST due to the reversible thermodynamic transformation will lower the HCST of the solution to its initially annealed state. This transformation is reversible so long as there is no appreciable polymer molecular weight degradation during the annealing step. The transformation in the solution state accompanied with polymer molecular weight degradation during the annealing step is not reversible. The ULTEM:MATRIMID blend solutions in our tests which were exposed to temperatures in excess of 125° C. for more than 2 hours undergo polymer molecular weight degradation, and exhibit a permanent reduction in HCST.

TABLE 4

EFFECT OF ANNEALING ON ULTEM AND MATRIMID
MOLECULAR WEIGHT AND MOLECULAR
WEIGHT DISTRIBUTION

| Sample | Annealing Time at 100° C. (hrs) | $M_n$ | $M_w$ | $M_w/M_n$ |
|---|---|---|---|---|
| ULTEM[1] - CONTROL | 0 | 25K | 50K | 2 |
| ULTEM[1] - ANNEALED | 2 | 25K | 50K | 2 |
| ULTEM[1] - ANNEALED | 4 | 25K | 49K | 2 |
| ULTEM[1] - ANNEALED | 8 | 24K | 47K | 2 |
| ULTEM[1] - ANNEALED | 12 | 23K | 45K | 1.9 |
| MATRIMID[2] - CONTROL | 0 | 41K | 80K | 2 |
| MATRIMID[2] - ANNEALED | 2 | 39K | 79K | 2.1 |
| MATRIMID[2] - ANNEALED | 4 | 39K | 79K | 2 |
| MATRIMID[2] - ANNEALED | 8 | 36K | 73K | 2 |
| MATRIMID[2] - ANNEALED | 12 | 36K | 70K | 2 |

[1]31% ULTEM + 2.3% $CaBr_2$ in NMP
[2]31% MATRIMID + 2.3% $CaBr_2$ in NMP

The data in Table 4 indicate that annealing of the ULTEM and MATRIMID solutions containing the preferred complexing agent at 100° C. does not cause any appreciable polymer molecular weight degradation for the time periods specified. This is especially true for ULTEM which appears to be more stable to thermal annealing than MATRIMID. Since a preferred embodiment of this invention is 90:10 ULTEM:MATRIMID blend solution, annealing the same solution would enhance the thermodynamic miscibility of the blend at temperatures below 100° C. It thus appears that the thermodynamic transformation of the polymer chain conformational structure in the solution state due to annealing occurs in the absence of any appreciable polymer molecular weight degradation.

Composite Fiber Soinning Examples with Two-Phase and Single-Phase Core Solutions The chemical structures of the ULTEM and the MATRIMID polyimides which will be utilized in the following examples are shown below.

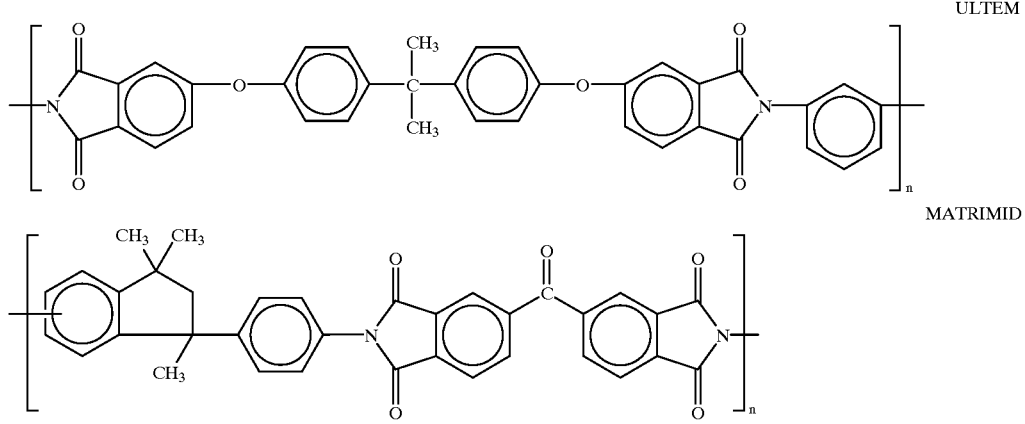

ULTEM

MATRIMID

COMPARATIVE EXAMPLE 1

A core solution containing 31% total weight of a polymer blend comprising 90:10 weight of a polymer A, ULTEM 1000 (commercially available from GE) and a polymer B, MATRIMID 5218 (commercially available from Ciba), 2.3% weight of $LiNO_3$, 9.3% weight of tetramethylenesulfone, 1.6% weight of acetic anhydride, and 0.03% weight of acetic acid in N-methylpyrrolidone was prepared. During preparation and degassing steps, the temperature of the core solution was not allowed to exceed 40° C. The HCST of a sample of the same core solution was measured to be about 55° C. Since this core solution was purposefully maintained below the HCST, the ULTEM-:MATRIMID blend core solution was in the two phase region of the thermodynamic phase diagram.

In accordance with U.S. Pat. No. 5,085,676, this core solution was coextruded at a rate of 125 $cm^3$/hour through a composite fiber spinneret having fiber channel dimensions of outer diameter equal to 559 microns ($5.59 \times 10^{-4}$ meters) and inner diameter equal to 254 microns ($2.54 \times 10^{-4}$ meters) at 80° C.

A separating polymer solution containing 26% weight of MATRIMID 5218 polyimide, 7.8% weight of tetramethylenesulfone, 1.3% weight of acetic anhydride, and 0.26% weight of acetic acid in N-methylpyrrolidone was coextruded at a rate of 15 $cm^3$/hr. A solution containing 90% weight of N-methylpyrrolidone in $H_2O$ was injected into the bore of the fiber at a rate of 45 $cm^3$/hr. The nascent filament traveled through an air-gap length of 3 cm at room temperature into a water coagulant bath maintained at 25° C. and was wound up at a rate of 90 meters/minute.

The water-wet fiber was washed with running water at 50° C. for about 12 hours and dehydrated as disclosed in U.S. Pat. No. 4,080,744 and U.S. Pat. No. 4,120,098. This specifically involved the replacement of water with methanol followed by the replacement of methanol with hexane and drying in a vacuum oven (2.67 kPa) at room temperature followed by drying at 100° C. The fibers were potted in an epoxy resin at both ends inside a straight steel tubing to provide gas feed through the bore of the fibers.

The fibers were tested for mixed gas $O_2/N_2$ (21/79) with 100 psi bore feed pressure at 21° C. The fibers exhibited the following gas separation properties while producing an inerts-enriched product stream containing 95% inerts: $O_2$ Permeance=93 GPU; $O_2/N_2$ Selectivity=1.2.

The fibers were treated to seal defects protruding through the dense outer gas separating layer as disclosed in U.S. Pat. No. 4,230,463. This involved contacting the outer surface of the fibers with an iso-octane solution containing 2% weight Sylgard-184 silicone elastomer available from Dow Corning Corporation for about 30 minutes at room temperature. The iso-octane solution was drained and the fibers were allowed to air dry. The fibers were tested for mixed gas $O_2/N_2$ (21/79) with 100 psi bore feed pressure at 21° C.

The fibers exhibited the following gas separation properties while producing an inerts-enriched product stream containing 95% inerts: $O_2$ Permeance=32 GPU; $O_2/N_2$ Selectivity=1.2. The above permeation data indicate that the composite fibers spun from a two-phase core solution could not be post-treated to the full $O_2/N_2$ selectivity of the MATRIMID separating polymer which has an intrinsic $O_2/N_2$ selectivity of about 7.

While not wishing to be bound by any theory, we believe the two-phase core solution impairs the structural integrity of the composite fiber and interferes with the formation of an integral MATRIMID sheath structure separating skin layer. The lack of post-treatability of the fiber is due to the presence of large defects in the fiber separating skin structure which could not be completely sealed even after treatment with a relatively high Sylgard content solution. The fact that the composite fibers suffered a large reduction in the magnitude of the permeance as a result of the post-treatment depicts that the fibers were coated with the Sylgard polymer.

EXAMPLE 1

A core solution containing 32.50% total weight of a polymer blend comprising 90:10 weight ULTEM 1000 and MATRIMID 5218, 2.4% weight of $CaBr_2$, and 6.5% weight of tetramethylenesulfone in N-methylpyrrolidone was prepared. During the preparation of the solution, the solution was exposed to 80° C. for about 2 hours and 90° C. for an additional 2 hours. The core solution was then degassed and annealed at 70° C. for about 12 hours. The HCST of this core solution was measured to be about 37° C.

During the mixing and annealing steps, this core solution was kept above the HCST, and therefore, the core solution was in the single-phase region of the thermodynamic phase diagram. This core solution was coextruded at a rate of 125 cm³/hour with the same separating polymer solution described in Comparative Example 1, which was coextruded at 15 cm³/hr through the same composite fiber spinneret at 80° C. The same bore fluid composition and the spinning process conditions described in the Comparative Example 1 were used, except that the air-gap length through which the nascent fiber traveled was kept at 5 cm.

The fibers were washed, dehydrated and tested for mixed gas $O_2/N_2$ (21/79) with 100 psi bore feed pressure at 21° C. The fibers exhibited the following gas separation properties while producing an inerts enriched product stream containing 95% inerts: $O_2$ Permeance=66 GPU; $O_2/N_2$ Selectivity= 2.7.

The fibers were treated to seal defects in the dense separating layer and retested as described in the Comparative Example 1. The fibers exhibited the following gas separation properties while producing an inerts enriched product stream containing 95% inerts: $O_2$ Permeance=11 GPU; $O_2/N_2$ Selectivity=6.2.

The above permeation data indicate that the composite fibers spun from a single phase core solution could be post-treated up to a selectivity which is closer to the full $O_2/N_2$ selectivity of the MATRIMID separating polymer. This is contrary to the post-treated permeation data obtained with composite fibers spun from a two-phase core solution as discussed in the Comparative Example 1.

EXAMPLE 2

The failure pressure of the composite fibers described in Comparative Example 1 and Example 1 was measured by pressurization from the tube side. The fibers were subjected to increasing levels of $N_2$ pressure from the bore side and the $N_2$ permeate flow rate was measured at each pressure. These measurements were made at room temperature. These data are summarized in FIG. 2.

Figure 2:
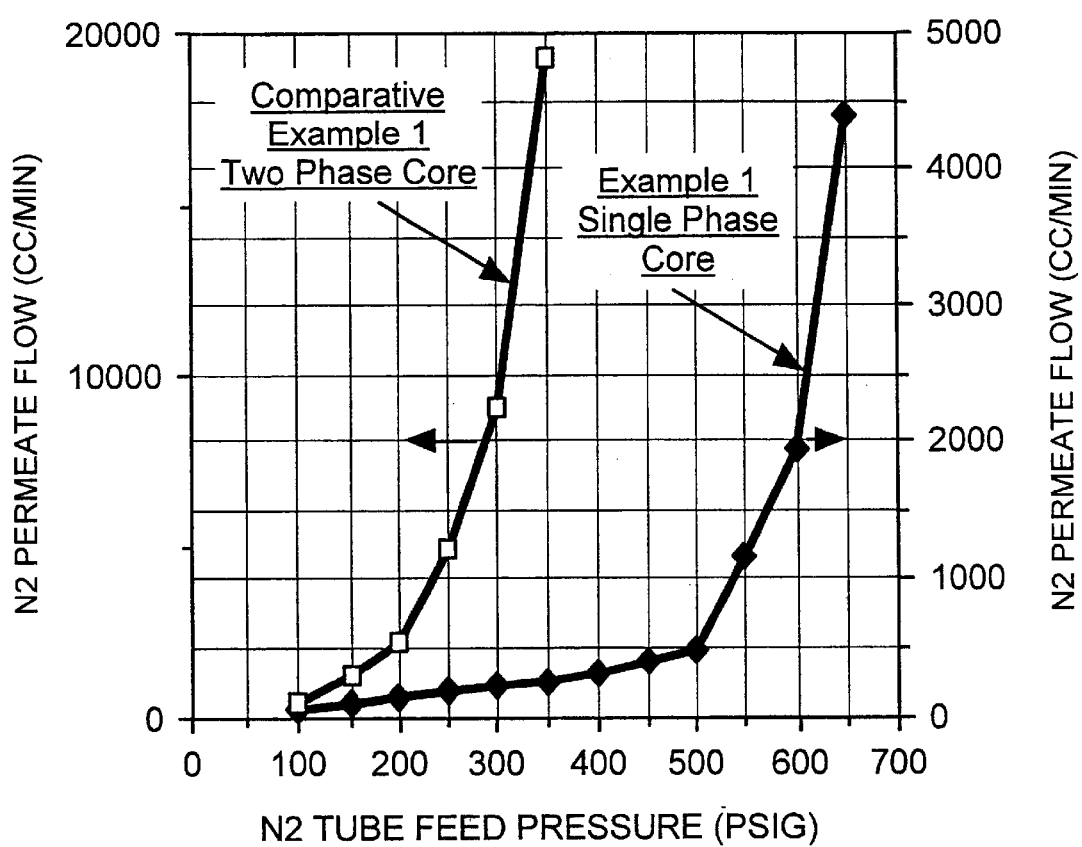
FIG. 2 is a graph of the $N_2$ permeate flow versus the $N_2$ tube feed pressure of composite hollow fibers prepared in Comparative Example 1 and Example 1.

The data in FIG. 2 clearly indicate that the failure pressure of the composite fibers spun with a single-phase core solution is greater than 500 psi, whereas the failure pressure of the fibers spun with a two-phase core solution is about 200 psi. In these measurements, the composite fiber failure pressure corresponds to the bore $N_2$ pressure at which point the $N_2$ pressure versus the $N_2$ permeate flow rate relation begins to deviate from linear functionality and starts to increase abruptly. The failure pressure of the composite fibers spun from the single-phase core solution is more than twice that of the counterparts spun from the two-phase core solution. This is a very critical issue because the ability of hollow fiber membranes to withstand high pressures for prolonged times is a key factor in commercial applications.

The mechanical properties of the same fiber samples were also measured in extension at room temperature. The fiber mechanical properties are summarized in Table 5 below.

TABLE 5

FIBER MECHANICAL PROPERTIES

| Core Solution Phase Behavior | Elastic Modulus (KSI) | Yield Stress (KSI) | Maximum Stress (KSI) | Maximum Strain (%) |
| --- | --- | --- | --- | --- |
| Two-Phase | 134 | 3.1 | 4.7 | 57 |
| Single-Phase | 90 | 3.8 | 5.8 | 144 |

In Table 5, the elastic modulus was measured in extension according to ASTM D2256 at room temperature. Yield stress was measured in extension at room temperature, which is defined as the point of intersection of the tangent of the initial high slope portion of the stress strain curve and the tangent of the immediately following nearly flat portion of the stress strain curve. The measurements were performed at a strain rate of 25% per minute. The two-phase core solution is as described in Comparative Example 1, and the single-phase core solution is as described in Example 1.

Although the composite fibers spun from the two-phase core solution exhibit a higher elastic modulus, the composite fibers spun from the single-phase core solution exhibit higher yield stress, maximum stress at break, and significantly higher maximum strain at break. Since it is reasonable to assume that creep starts when the fiber is stressed beyond its yield stress and therefore that the relevant material property in determining the fiber failure pressure is the yield stress, one would expect that the fibers spun from the two-phase core solution would exhibit inferior failure pressure as compared to their counterparts spun from the single-phase core solution. This is consistent with the failure pressure data shown in FIG. 2.

Furthermore, the short elongation at break which the fibers spun from the two-phase core solution exhibit would severely limit the mechanical handling of the fibers after the spinning operation such as bobbin winding, skeining, and fabrication of hollow fiber permeators.

COMPARATIVE EXAMPLE 2

Composite fibers were spun by using the same core and sheath formulations, and at the same spinning process conditions described in the Comparative Example 1, except the air-gap length through which the nascent fiber traveled was kept at 2 cm. The fibers were washed, dehydrated, and tested for mixed gas $O_2/N_2$ (21/79) with 100 psi bore feed pressure at 21° C.

The fibers exhibited the following gas separation properties while producing an inerts-enriched product stream containing 95% inerts: $C_2$ Permeance=79 GPU; $O_2/N_2$ Selectivity=1.5.

The fibers were treated to seal defects in the dense separating layer and retested as described in the Comparative Example 1. The fibers exhibited the following gas separation properties while producing an inerts-enriched product stream containing 95% inerts: $O_2$ Permeance=16 GPU; $O_2/N_2$ Selectivity=2.5.

The above permeation data also depicts that the composite fibers spun from a two-phase core solution could not be post-treated to the full $O_2/N_2$ selectivity of the MATRIMID separating polymer.

EXAMPLE 3

Composite fibers were spun by using the same core and sheath formulations, and at the same spinning process conditions described in the Example 1, except the air-gap length through which the nascent fiber traveled was kept at 2 cm. The fibers were washed, dehydrated, and tested for mixed gas $O_2/N_2$ (21/79) with 100 psi bore feed pressure at 21° C. The fibers exhibited the following gas separation properties while producing an inerts-enriched product stream containing 95% inerts: $O_2$ Permeance=102 GPU; $O_2/N_2$ Selectivity=1.6.

The fibers were treated to seal defects in the dense separating layer and retested as described in the Comparative Example 1. The fibers exhibited the following gas separation properties while producing an inerts-enriched product stream containing 95% inerts: $O_2$ Permeance=14 GPU; $O_2/N_2$ Selectivity=6.8.

The above permeation data also depict that the composite fibers spun from a single-phase core solution could be post-treated up to a selectivity which is closer to the full $O_2/N_2$ selectivity of the MATRIMID separating polymer.

EXAMPLE 4

The fibers described in the Comparative Example 2 and Example 3 were tested for $O_2/N_2$ permeation properties with 100 psi tube feed pressure after exposure of the fibers to 300 and 500 psi for 30 minutes intervals for determination of their respective failure pressures. For this type of measurement, the failure pressure of the fiber is defined as the maximum bore pressure the fiber can withstand with full retention of the initial selectivity. The permeation data for these fibers are summarized in Table 6 below.

TABLE 6

TUBE FEED $O_2/N_2$ PERMEATION PROPERTIES
AS A FUNCTION OF PRESSURE[1]

| Fiber State | $O_2$ Performance (GPU) | $O_2/N_2$ Selectivity | Remarks |
| --- | --- | --- | --- |
| Two-Phase[2] | 16 | 2.5 | Initial |
| Two-Phase[2] | 29 | 1.5 | After 30 minutes of exposure to 300 psi. |
| Two-Phase[2] | 161 | 1.1 | After 30 minutes of exposure to 500 psi. |
| Single-Phase[3] | 14 | 6.8 | Initial |
| Single-Phase[3] | 15 | 6.8 | After 30 minutes of exposure to 300 psi. |
| Single-Phase[3] | 16 | 6.6 | After 30 minutes of exposure to 500 psi. |

[1]All permeation data were measured at 100 psig feed pressure at 21° C. while producing 90 to 96% inerts-enriched air.
[2]Two-phase solutions are those described in Comparative Example 2.
[3]Single-phase solutions are those described in Example 3.

It is clear from the data summarized in Table 6 that the composite fibers spun with the two-phase core formulation failed at a bore pressure less than or equal to 300 psi, whereas the fibers spun with the single-phase core solution essentially retained full selectivity after exposure to 500 psi.

This example also illustrates the superior mechanical properties of the polyimide blend composite hollow fibers spun from a single-phase core solution.

This invention has been described in detail with particular reference to examples and preferred embodiments thereof, but it is to be understood that variations and modifications may be resorted to as will be apparent to those skilled in the art. Such variations and modifications are to be considered within the purview and scope of the claims appended hereto.

What is claimed is:

1. A membrane which is made from a polymer blend solution comprising a plurality of polyimides, a solvent, and a critical solution temperature (CST) adjustment agent selected from the group consisting of alkali or alkaline earth metal halides, triethylamine, and combinations thereof, said CST adjustment agent being present in an amount effective to enhance the miscibility of said plurality of polyimides in solution.

2. The membrane according to claim 1, which is in the form of hollow fibers.

3. The membrane according to claim 1, wherein the polymer blend solution which comprises a first Polymer A having the following repeating unit:

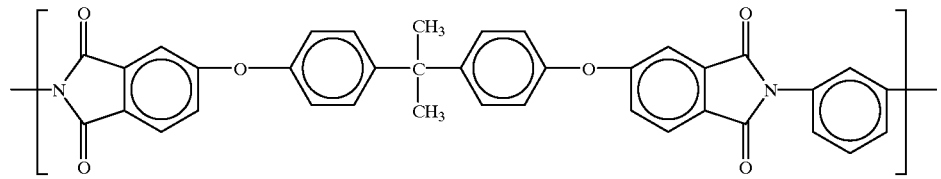

and a second Polymer B having the following repeating unit:

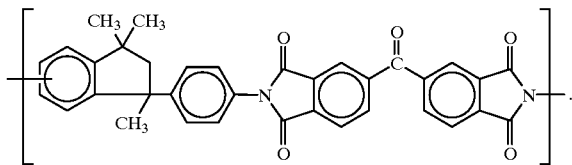

4. The membrane according to claim 3, which comprises between 80% and 95% by weight of Polymer A based on the total polymer content in the solution.

5. The membrane according to claim 1, wherein the CST adjustment agent is an alkali or alkaline earth metal halide.

6. The membrane according to claim 1, wherein the CST adjustment agent is $ZnCl_2$, $CaBr_2$, LiCl, triethylamine, or combinations thereof.

7. The membrane according to claim 1, wherein the polymer blend solution has a HCST that is at least 10° C. lower than the same blend solution without a CST adjustment agent.

8. The membrane according to claim 1, wherein the solvent comprises N-methylpyrrolidone.

9. A method of making the membrane according to claim 1, which comprises coextruding said polymer blend solution with a sheath solution to form composite hollow fibers.

10. A membrane which is made from a polymer blend solution comprising a plurality of polyimides and a solvent, wherein said solution has been annealed at a temperature effective to lower a higher critical solution temperature (HCST) of the solution.

11. The membrane according to claim 1, wherein the temperature is between 50° C and 140° C.

12. The membrane according to claim 11, wherein the temperature is between 70° C and 100° C.

13. The membrane according to claim 10, wherein the solution comprises a critical solution temperature (CST) adjustment agent.

14. The membrane according to claim 13, wherein the CST adjustment agent is $ZnCl_2$, $CaBr_2$, LiCl, triethylamine, or combinations thereof.

15. The membrane according to claim 10, wherein the solvent comprises N-methylpyrrolidone.

16. The membrane according to claim 10, which is in the form of hollow fibers.

17. A method of making the membrane according to claim 10, which comprises coextruding said polymer blend solution with a sheath solution to form composite hollow fibers.

* * * * *

UNITED STATES PATENT AND TRADEMARK OFFICE
CERTIFICATE OF CORRECTION

PATENT NO.     : 6,383,265 B1
DATED          : May 7, 2002
INVENTOR(S)    : Okan Max Ekiner It is certified that error appears in the above-identified patent and that said Letters Patent is hereby corrected as shown below:

<u>Column 12,</u>
Line 66, please replace the number "1" with the number -- 10 --.

Signed and Sealed this

Third Day of December, 2002

JAMES E. ROGAN
*Director of the United States Patent and Trademark Office*